(12) United States Patent
De Souza, Filho et al.

(10) Patent No.: US 8,727,678 B2
(45) Date of Patent: May 20, 2014

(54) AUTOBALANCING SYSTEM FOR BORING TOOL AND BORING TOOL INCORPORATING SAME

(75) Inventors: Ruy Frota De Souza, Filho, Latrobe, PA (US); Antonio Juarez Pereira, Jr., Sao Paulo (BR)

(73) Assignee: Kennametal Inc., Latrobe, PA (US)

( * ) Notice: Subject to any disclaimer, the term of this patent is extended or adjusted under 35 U.S.C. 154(b) by 343 days.

(21) Appl. No.: 13/232,414

(22) Filed: Sep. 14, 2011

(65) Prior Publication Data
US 2013/0064618 A1    Mar. 14, 2013

(51) Int. Cl.
*B23B 29/03*    (2006.01)

(52) U.S. Cl.
CPC .................................... *B23B 29/03* (2013.01)
USPC .......................................................... 408/143

(58) Field of Classification Search
USPC ................................. 408/143, 159, 161, 181
IPC .............................................. B23B 29/03,29/34
See application file for complete search history.

(56) References Cited

U.S. PATENT DOCUMENTS

| | | | |
|---|---|---|---|
| 4,229,127 A | 10/1980 | Bartley | |
| 5,174,697 A * | 12/1992 | Ariyoshi | 408/239 R |
| 5,251,511 A * | 10/1993 | Muendlein et al. | 82/1.2 |
| 5,316,417 A * | 5/1994 | Romi | 408/153 |
| 5,326,198 A | 7/1994 | Romi | |
| 5,478,177 A * | 12/1995 | Romi | 408/143 |
| 5,611,651 A * | 3/1997 | Wohlhaupter et al. | 408/153 |
| 5,902,078 A | 5/1999 | Kaiser et al. | |
| 5,909,986 A * | 6/1999 | Kaiser et al. | 408/181 |
| 5,971,675 A | 10/1999 | Romi | |
| 6,053,082 A * | 4/2000 | Rupp et al. | 82/1.2 |
| 7,260,877 B2 * | 8/2007 | Broadley | 29/27 R |
| 7,585,139 B2 | 9/2009 | Stadelmann et al. | |
| 2004/0228695 A1 * | 11/2004 | Clauson | 408/161 |

* cited by examiner

*Primary Examiner* — Andrea Wellington
*Assistant Examiner* — Alan Snyder
(74) *Attorney, Agent, or Firm* — Larry R. Meenan, Esq.

(57) ABSTRACT

A boring head comprises a housing disposed about a central longitudinal axis and a movement transmission mechanism disposed at least one of on or in the housing. The housing includes a first end adapted to be coupled to a machine tool and an opposite second end having a cutting insert movably coupled thereto. The movement transmission mechanism comprises a rotatable member mounted to be rotatable relative to the housing, a balancing mass, and a main shaft disposed in the housing. The main shaft is rotatable about the longitudinal axis and operationally coupled to the ring, the balancing mass, and the cutting insert. Rotation of the rotatable member a predetermined amount causes movement of the cutting insert a corresponding predetermined amount in a first radial direction with respect to the longitudinal axis and movement of the balancing mass a corresponding predetermined amount in a second radial direction opposite the first radial direction.

6 Claims, 4 Drawing Sheets

AUTOBALANCING SYSTEM FOR BORING TOOL AND BORING TOOL INCORPORATING SAME

BACKGROUND

1. Field of the Invention

The present invention relates to a device for compensating masses, and particularly to a device for compensating masses in rotary boring heads used for finishing high precision bores. The present invention also relates to a rotary boring head incorporating such a mass compensating device.

2. Background Information

In the prior art, boring heads are known of the type that are fixed on a machine tool main spindle such that there is only one single position under which the center of gravity of the movable sliding element of the tool holder and the cutting tool itself coincide with the rotating axis of the boring head.

It is also known in the prior art that with the displacement of the movable parts of the boring head, the center of gravity of the boring head changes its balancing position, which is normally located over the rotating axis, leading to the unbalancing of the boring head. This unbalancing action increases even more as a sliding element in the boring head to which a cutting element is coupled is radially displaced to the outside in relation to the rotating axis.

Owing to vibrations generated by the lack of balancing masses in the boring head, the harm caused to the precision and finishing of bores during machining have led to the addition of balancing devices to the boring heads.

In addition, since the bore precision is micrometric and rotation of current boring heads reaches extremely high levels, any unbalancing, even if only of a minute increment, leads to a quality loss of the machining job, because in these cases very close tolerances in the order of thousandths of a millimeter are under consideration.

In the prior art, an attempt has been made to overcome the unbalancing condition through the action of counterweights for mass displacement. However, it is a disadvantage that the known embodiments of such counterweights do not enable the rotary boring head to attain sufficiently high levels of graduated balancing operation adequate for each situation.

Additionally, known balancing systems typically require manual adjustment in order to satisfactorily balance the cutting tool which may be very time consuming, depending on the desired balancing quality.

Accordingly, there exists a need for improved systems for balancing rotary boring tools.

SUMMARY OF THE INVENTION

Accordingly, deficiencies in the prior art are addressed by embodiments of the invention which are directed to a boring head having an automatic balancing means.

As one aspect of the invention, a boring head comprising a housing disposed about a central longitudinal axis and a movement transmission mechanism disposed at least one of on or in the housing is provided. The housing having a first end adapted to be coupled to a machine tool and an opposite second end having a cutting insert movably coupled thereto. The movement transmission mechanism comprising a rotatable member mounted to be rotatable relative to the housing, a balancing mass, and a main shaft disposed in the housing. The main shaft being rotatable about the longitudinal axis and operationally coupled to the ring, the balancing mass, and the cutting insert. Rotation of the rotatable member a predetermined amount causes movement of the cutting insert a corresponding predetermined amount in a first radial direction with respect to the longitudinal axis and movement of the balancing mass a corresponding predetermined amount in a second radial direction opposite the first radial direction.

The movement transmission mechanism may further comprise a main shaft disposed in the housing, the main shaft being rotatable about longitudinal axis and operationally coupled to the rotatable member, the balancing mass, and the cutting insert.

The main shaft may be operatively coupled to the rotatable member via a stepped gear having a larger diameter portion and a smaller diameter portion.

The rotatable member may comprise a ring including an inner face having a number of toothed segments that cooperatively engage the larger diameter portion of the stepped gear and the main shaft may include a central gear that cooperatively engages the smaller diameter portion of the stepped gear.

The main shaft may comprise a first threaded portion that cooperatively engages a carrier member slidably disposed within an angled passage of the balancing mass.

The balancing mass may be constrained to movement only along a transverse axis oriented transverse to the longitudinal axis by a pair of alignment pins.

The main shaft may further comprise a second threaded portion that cooperatively engages a sliding pin having a linear portion and an angled portion, the angled portion slidably engaging an angled passage formed in a transverse rod to which the cutting insert is coupled.

As another aspect of the invention, a boring head having a movement transmission mechanism for selectively moving a cutting insert a desired amount is provided. The movement transmission mechanism comprises a means for selectively radially displacing the cutting insert the desired amount in a first direction and a means for selectively radially displacing a balancing mass in a second direction opposite the first direction. In such arrangement, the displacement of the balancing mass in the second direction effectively counters the displacement of the cutting insert in the first direction such that rotational balance of the boring head is automatically maintained.

The radial displacement of the cutting insert and the radial displacement of the balancing mass may be carried out simultaneously by the movement transmission mechanism.

The movement transmission mechanism may be disposed in or on a housing and may comprise a rotatable member adapted to be rotated a predetermined amount in order to cause the cutting insert to move the desired amount.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
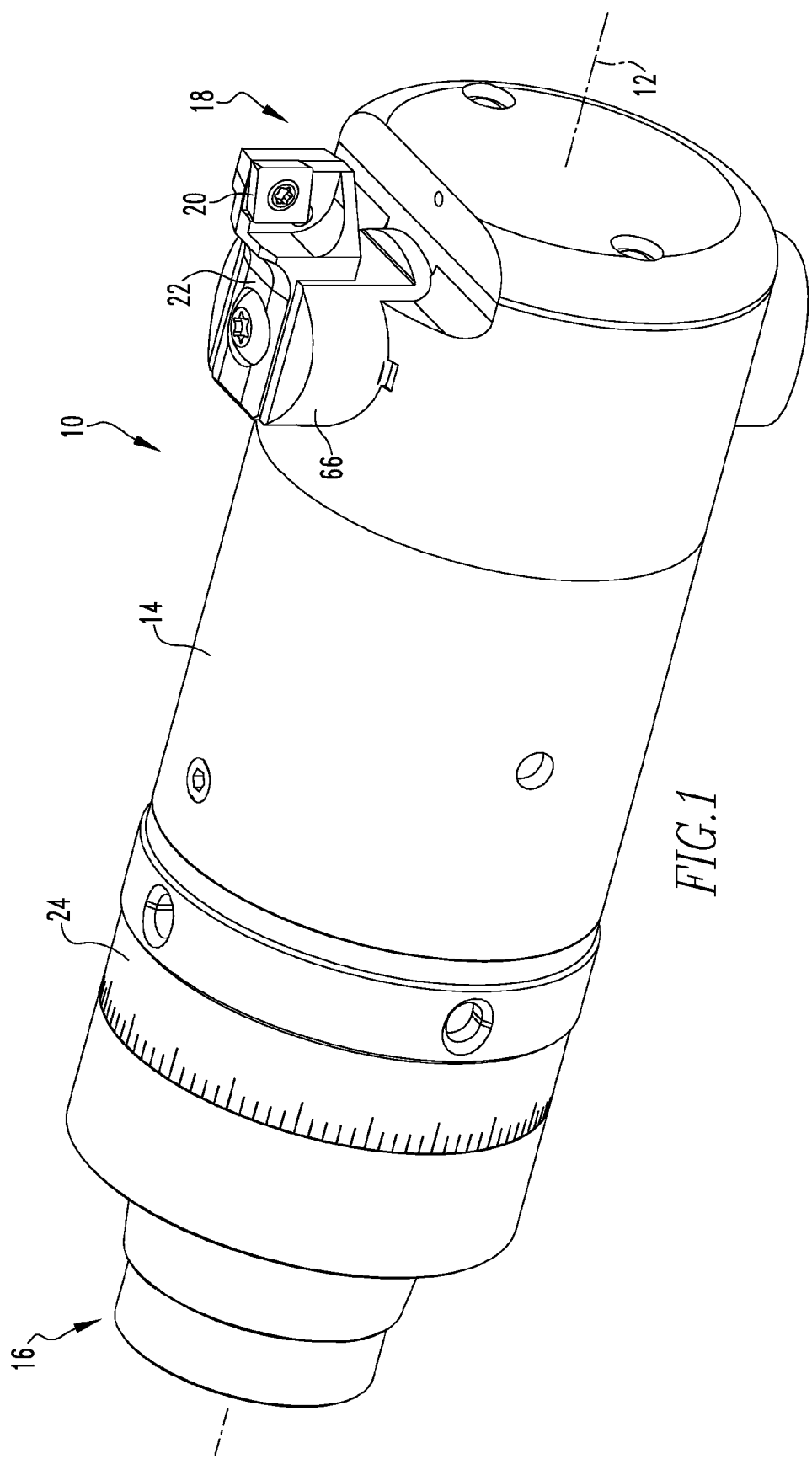
FIG. 1 shows an isometric view of a boring head in accordance with an example embodiment of the present invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e., one or any quantity greater than one).

As used herein, the term "about" shall be used to refer to a point near, or at, a particular identified point (i.e., proximate).

FIGS. 1-4 depict an example boring head 10, in accordance with a non-limiting embodiment of the present invention, for conducting precision finish-boring operations on a workpiece (not shown) when boring head 10 is rotated about a central longitudinal axis 12 by a machine tool (not shown). Referring to FIG. 1, boring head 10 includes a body or housing 14 of substantially cylindrical shape disposed about the central longitudinal axis 12. The housing 14 includes a first end 16 adapted to be coupled to the previously mentioned machine tool (via any suitable means) and an opposite second end 18. Although depicted as having a substantially cylindrical shape of generally uniform diameter, it is to be appreciated that housing 14 may be formed from a number of substantially cylindrical portions of various diameter without varying from the scope of the present invention. A cutting insert 20, selectively coupled to a cartridge 22, is provided generally at or about second end 18 of housing 14.

Figure 3:
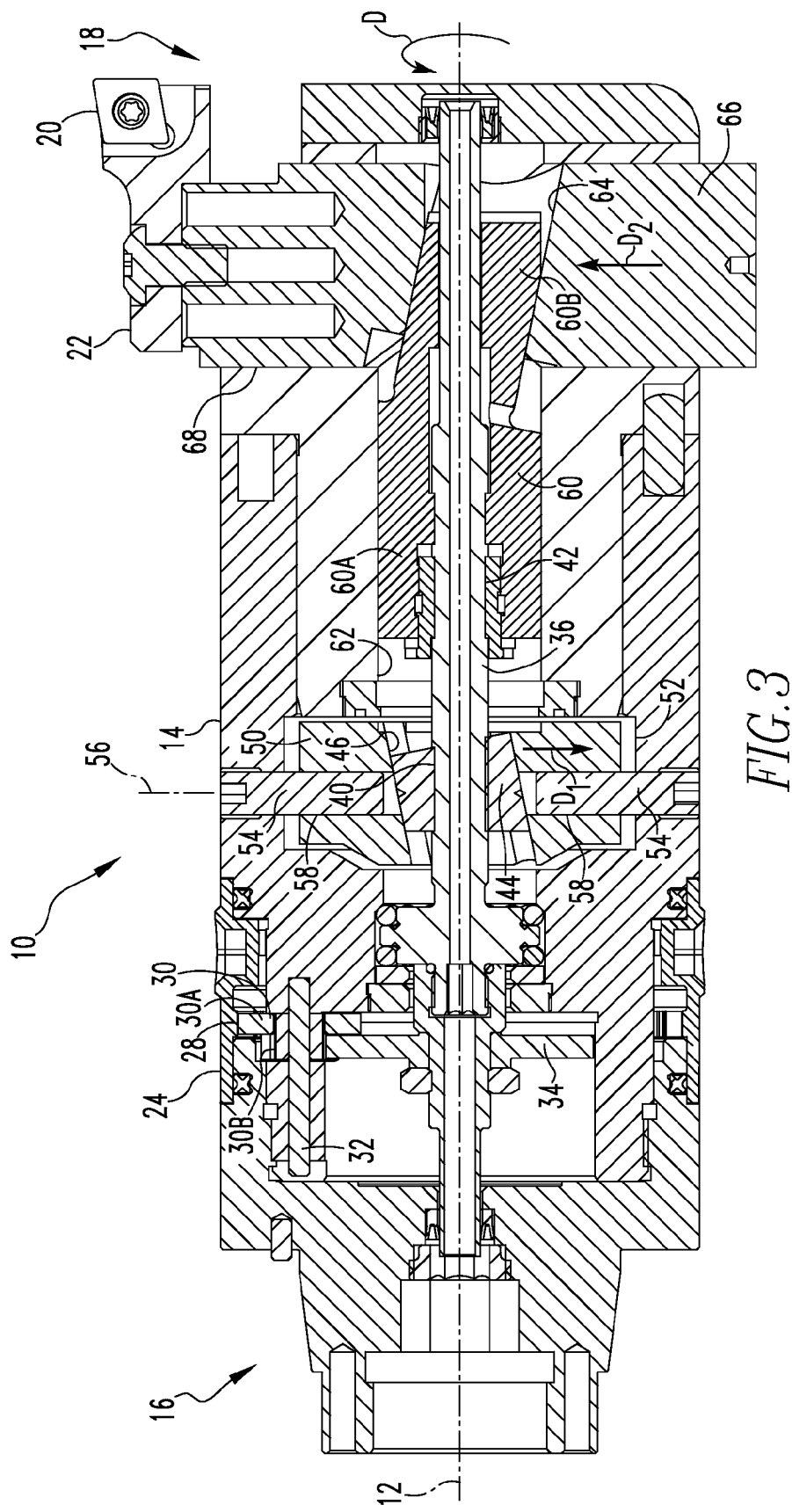
FIG. 3 is a cross-sectional view of the boring head of FIG. 1 taken along line 3-3 of FIG. 2.

Referring to FIGS. 1 and 3, boring device 10 further includes a movement transmission mechanism (not numbered) which comprises a rotatable member, such as ring 24 in the illustrated embodiment, mounted to be rotatable relative to housing 14. As described below, rotation of ring 24 a predetermined amount causes movement of the cartridge 22 in a direction perpendicular to the longitudinal axis 12 of housing 14 thus resulting in radial displacement of cutting insert 20 in a corresponding predetermined amount. Such controlled movement is achieved through the operative or operational coupling of several components as described in detail below. In the illustrated example boring device 10, rotatable ring 24 of the movement transmission mechanism is rotatable and externally graduated. The ring 24 is arranged to be generally coaxial with housing 14. Although shown as a ring 24 disposed about longitudinal axis 12, it is to be appreciated that a dial type (not pictured) rotatable member (e.g., without limitation, rotatable about an axis transverse to longitudinal axis 12) or other suitable member could instead be substituted for ring 24 without varying from the scope of the present invention.

Referring to the cross-sectional view of FIG. 3, an inner face (not numbered) of ring 24 is provided with a number of toothed segments 28 that interact with the larger diameter portion 30A of a stepped gear 30 which is rotatably mounted in housing 14 about a gear shaft 32. As shown in FIG. 3, gear shaft 32 is spaced a distance (not numbered) from, and mounted substantially parallel to, longitudinal axis 12. Continuing to refer to FIG. 3, the smaller diameter portion 30B of stepped gear 30 cooperatively engages a central gear 34 which is rotatably mounted about longitudinal axis 12 in housing 14.

Figure 4:
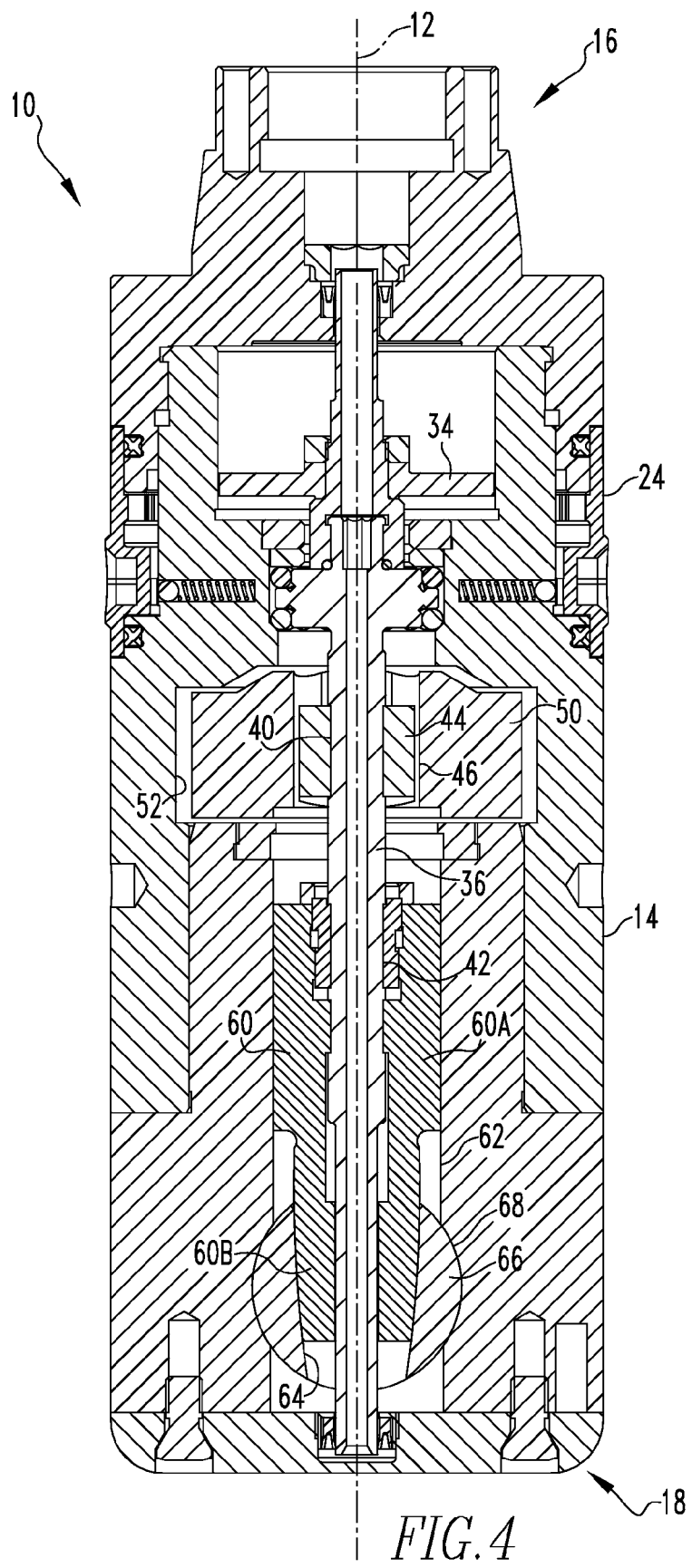
FIG. 4 is an cross-sectional view of the boring head of FIG. 1 taken along line 4-4 of FIG. 2.

Referring to the cross-sectional views of FIGS. 3 and 4, extending axially from, and rigidly coupled to, central gear 34 is a main shaft 36 disposed coaxially with, and rotatable about, longitudinal axis 12. Main shaft 36 is generally cylindrical in shape but may have a varying radius, such as shown in the example embodiment of FIG. 3. Main shaft 36 includes a first threaded portion 40 and a second threaded portion 42. A carrier member 44 is disposed about, and includes a cooperatively threaded portion (not numbered) in communication with, first threaded portion 40 such that rotational movement of main shaft 36 about longitudinal axis 12 results in axial movement of carrier member 44 along longitudinal axis 12.

Carrier member 44 is slidably disposed within an angled passage 46 of a balancing member or balancing mass 50 which is disposed within an opening 52 of housing 14. Movement of balancing mass 50 within opening 52 is restricted by a pair of alignment pins 54 which project into opening 52 from housing 14 along a transverse axis 56 oriented generally perpendicular to longitudinal axis 12. Each of the alignment pins 54 slidably interact with a transverse bore 58 in balancing mass 50. It is to be appreciated that the interaction of alignment pins 54 with transverse bore 58 of balancing mass 50 limits movement of balancing mass 50 to the extent that balancing mass 50 can only move along transverse axis 56 (i.e., transverse to longitudinal axis 12) responsive to axial movement of carrier member 44 along longitudinal axis 12.

Continuing to refer to FIGS. 3 and 4, a second threaded portion 42 of main shaft 36 cooperatively engages a threaded portion (not numbered) of an axial sliding pin 60, which is disposed generally about, and axially moveable along, main shaft 36 within a linear passage 62 of housing 14 generally near second end 18. As shown in FIG. 3, sliding pin 60 includes a linear portion 60A and an angled portion 60B disposed nearer second end 18 of housing 14. Angled portion 60B slidably engages an angled passage 64 formed in a transverse rod 66 which itself is slidably disposed within a transverse bore 68 which extends through housing 14 generally at or about second end 18. Angled portion 60B and angled passage 64 are preferably generally cylindrical in shape, such as shown in the illustrated embodiment. The cartridge 22 and thus cutting insert 20, previously described, are selectively coupled to an end (not numbered) of transverse rod 66 such that cutting insert 20 translates radially with respect to longitudinal axis 12 upon movement of transverse rod 66.

In order to maintain static balance of boring device 10, the particular size and required radial movement of the balancing mass 50 is dependent on the amount of unbalance (product of amount of mass displaced times displacement of such mass) caused by the radial movement of transverse rod 66 and attached components 22 and 20. It is to be appreciated that maintaining static balance is of primary concern in a boring device 10 while the dynamic balance of such device is of lesser concern due to the relatively short length of the boring device 10 and rigidness of housing 14.

In order to minimize the size of the opening 52, balancing mass 50 is preferably made out of a high density material such as, for example, without limitation, tungsten alloy, although other suitable materials may be used without varying from the scope of the present invention. The balancing mass 50 is calculated to generate the same unbalance (directed in an opposite direction) as the transverse rod 66, cartridge 22 and insert 20 (including screws). The product of the balancing mass and its displacement needs to be equal to the product of the summation of masses of 66, 22, 20 and the radial displacement thereof. It is to be appreciated that the angle (not numbered) of angled passage 46 of carrier member 44 (which causes radial movement of balancing mass 50) does not need to be the same as the angle (not numbered) of angled portion 60B of sliding pin 60. A smaller balancing mass can be used if the angle of angled passage 46 is steeper (thus causing greater radial movement of balancing mass 50 per axial movement of carrier member 44). Conversely, a larger mass may be required if the angle of angled passage 46 is less steep.

Having thus described the basic components of the movement transmission mechanism of boring head 10, an overview of its operation will now be provided.

In order to induce a desired radial movement of cutting insert 20 with respect to boring head 10, an operator simply rotates ring 24 a desired amount with respect to housing 14 according to the graduations disposed on ring 24. As ring 24 is rotated, stepped gear 28 rotates about gear shaft 32 in the same direction as ring 24 due to the interaction between toothed segments 28 of ring 24 and the larger diameter portion 30A of stepped gear 30. As stepped gear 30 rotates about gear shat 32, the smaller diameter portion 30B thereof interacts with central gear 34 causing central gear 34 to rotate in a direction opposite to that of ring 24. As main shaft 36 is rigidly coupled to central gear 34, main shaft 36 is also caused to rotate along with central gear 34.

Figure 2:
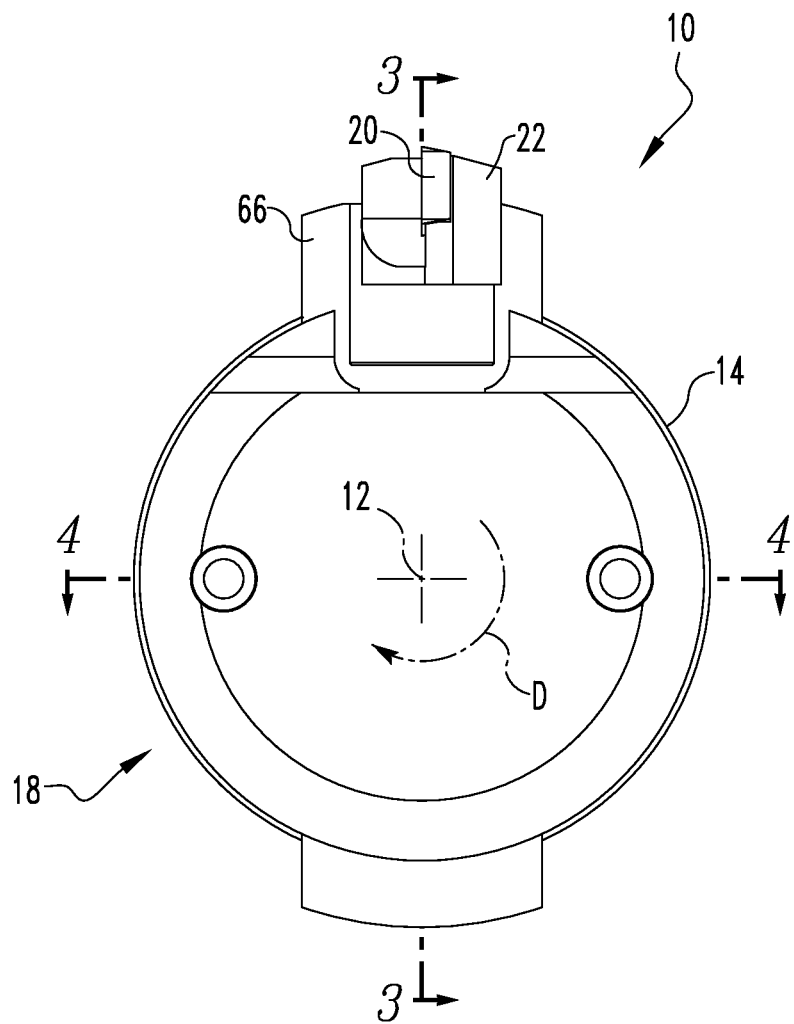
FIG. 2 is an end view of the boring head of FIG. 1.

When main shaft 36 is caused to rotate in a clockwise direction D (FIG. 3) with respect to the end view of FIG. 2, the interaction between first threaded portion 40 of main shaft 36 and the threaded portion (not numbered) of carrier member 44 causes carrier member 44 to move axially along main shaft 36 toward second end 18 of housing 14 (in applications where right-handed threads are used). The interaction between carrier member 44 and the angled passage 46 of balancing mass 50 causes balancing mass 50 to be shifted radially in a first direction $D_1$ (FIG. 3) with respect to housing 14 (and thus longitudinal axis 12) that is downward with respect to the cross-sectional view as oriented in FIG. 3 as carrier member 44 moves axially toward second end 18 of housing 14.

Concurrently with the interaction of the first threaded portion 40 and carrier member 44 described above, the second threaded portion 42 of main shaft 36 interacts with the threaded portion (not numbered) of the axial sliding pin 60 such that sliding pin 60, similar to carrier member 44, is translated axially along main shaft 36 toward second end 18 of housing 14. As sliding pin 60 translates toward second end 18, the interaction between angled portion 60B of sliding pin 60 and the angled passage 64 of transverse rod 66 causes transverse rod 66, and thus cartridge 22 and cutting insert 20 which are coupled thereto, to be shifted radially in a second direction $D_2$ (FIG. 3) with respect to housing 14 (and thus longitudinal axis 12) that is upward with respect to the cross-sectional view as oriented in FIG. 3, and notably opposite in direction to the direction $D_1$ in which balancing mass 50 is simultaneously moved.

It is to be appreciated that through such arrangement of the movement transmission mechanism, any change to the overall balance of the boring tool 10 resulting from radial movement of the cutting insert 20 is automatically compensated by the movement of the balancing mass 50 in the opposite direction. As in the example provided above, cutting insert 20 was displaced radially in the first direction $D_1$ while the balancing mass 50 was displaced radially in the second direction $D_2$, opposite the first direction.

Although the illustrated embodiment discussed herein utilizes two separate elements (carrier member 44 and sliding pin 60) that interact with main shaft 36 to cause radial movement of balancing mass 50 and transverse rod 66, it is to be appreciated that such separate elements could be combined as a single element utilized to produce such desired radial movements. However, the use of two separate elements 44,60 is generally preferred in order to provide a greater level of precision over the use of a single element.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A boring head comprising:
    a housing disposed about a central longitudinal axis, the housing having a first end adapted to be coupled to a machine tool and an opposite second end, the opposite second end having a cutting insert movably coupled thereto; and
    a movement transmission mechanism disposed at least one of on or in the housing, the movement transmission mechanism comprising:
        a rotatable member ring mounted to be rotatable relative to the housing;
        a balancing mass; and
        a main shaft disposed in the housing, the main shaft being rotatable about the longitudinal axis and operationally coupled to the ring, the balancing mass, and the cutting insert,
        wherein rotation of the rotatable member a predetermined amount causes movement of the cutting insert a corresponding predetermined amount in a first radial direction with respect to the longitudinal axis and movement of the balancing mass a corresponding predetermined amount in a second radial direction opposite the first radial direction,
        wherein the main shaft is operatively coupled to the rotatable member via a stepped gear having a larger diameter portion and a smaller diameter portion.

2. The boring head of claim 1 wherein the rotatable member comprises a ring including an inner face having a number of toothed segments that cooperatively engage the larger diameter portion of the stepped gear, and wherein the main shaft includes a central gear that cooperatively engages the smaller diameter portion of the stepped gear.

3. A boring head comprising:
    a housing disposed about a central longitudinal axis, the housing having a first end adapted to be coupled to a machine tool and an opposite second end, the opposite second end having a cutting insert movably coupled thereto; and
    a movement transmission mechanism disposed at least one of on or in the housing, the movement transmission mechanism comprising:
        a rotatable member ring mounted to be rotatable relative to the housing;
        a balancing mass; and
        a main shaft disposed in the housing, the main shaft being rotatable about the longitudinal axis and operationally coupled to the ring, the balancing mass, and the cutting insert,
        wherein rotation of the rotatable member a predetermined amount causes movement of the cutting insert a corresponding predetermined amount in a first radial direction with respect to the longitudinal axis and movement of the balancing mass a corresponding predetermined amount in a second radial direction opposite the first radial direction, wherein the main shaft comprises a first threaded portion that cooperatively engages a carrier member, the carrier member being slidably disposed within an angled passage of the balancing mass, wherein the balancing mass is constrained to movement only along a transverse axis oriented transverse to the longitudinal axis by a pair of alignment pins.

4. The boring head of claim 3 wherein the main shaft further comprises a second threaded portion that cooperatively engages a sliding pin having a linear portion and an angled portion, wherein the angled portion slidably engages an angled passage formed in a transverse rod to which the cutting insert is coupled.

5. The boring head of claim 2 wherein the main shaft comprises a first threaded portion that cooperatively engages a carrier member, the carrier member being slidably disposed within an angled passage of the balancing mass.

6. The boring head of claim 5 wherein the main shaft further comprises a second threaded portion that cooperatively engages a sliding pin having a linear portion and an angled portion, wherein the angled portion slidably engages an angled passage formed in a transverse rod to which the cutting insert is coupled.

* * * * *